April 15, 1958 H. W. BRYANT 2,831,067

SUBSCRIBER TELEPHONE SET

Filed Dec. 30, 1954 2 Sheets-Sheet 1

INVENTOR
H. W. BRYANT
BY John E. Cassidy
ATTORNEY

April 15, 1958 H. W. BRYANT 2,831,067

SUBSCRIBER TELEPHONE SET

Filed Dec. 30, 1954 2 Sheets-Sheet 2

INVENTOR
H. W. BRYANT
BY John E. Cassidy
ATTORNEY

United States Patent Office 2,831,067

Patented Apr. 15, 1958

2,831,067

SUBSCRIBER TELEPHONE SET

Herbert W. Bryant, Chatham, N. J., assignor to Bell Telephone Laboratories, Incorporated, New York, N. Y., a corporation of New York Application December 30, 1954, Serial No. 478,713

7 Claims. (Cl. 179—81)

This invention relates to a telephone subscriber set circuit and more particularly to a common battery subscriber set circuit incorporating a transistor amplifier so disposed in the circuit as to afford substantial improvement in the operation of the circuit.

As is well known in the art, subscriber telephone set circuits are generally located on the subscriber's premises and connected to the central switching station by means of two conductors arranged with the set circuit to form what is called a subscriber's loop. Loops are of differing lengths depending on the differing distances between the individual subscriber premises and the central station. The longest length of the loop permissible is limited: (1) by the decrease in the general volume of all speech signals particularly in the transmitting as opposed to the receiving direction; (2) by the greater attenuation of the higher frequency signals in the speech; and (3) by the decrease in the magnitude of the direct-current supervisory signals.

The transistor amplifier incorporated in the present set, disposed in a manner to be described, in addition to performing its primary function as a transmitter amplifier, operates as a frequency loss equalizer. That is to say, it compensates for the greater attenuation of the higher frequency components of the speech signals that takes place on nonloaded loops. As a result, the need for loading, heretofore necessary to compensate for both volume and high-frequency loss on long loops, will be greatly reduced or may be dispensed with entirely, and the transmission of all speech frequencies over long subscriber loops without loading when the present subscriber telephone set circuit is employed is at least as good as heretofore obtainable over unloaded loops of average length employing any presently known subscriber telephone set circuit.

A feature of the present invention therefore is the disposition of a transistor amplifier in a communication circuit in a manner to compensate for the characteristic greater attenuation of higher versus lower frequencies transmitted thereover.

When transistor amplifiers having inexpensive, low-power transistors were heretofore incorporated in subscriber telephone set circuits, the telephone transmitter in the circuit was connected directly to the transistor and either in series with the base electrode of the transistor or in series with the emitter electrode of the transistor. When connected in this manner, the magnitude of the direct current through the telephone transmitter, because of the low-current carrying capacity of the transistor per se, is restricted to a low value. In the case of the connection of the telephone transmitter in series with the base electrode of the transistor, the current through the telephone transmitter is of the order of three-tenths of a milliampere. When the connection of the telephone tranmitter is in series with the emitter electrode of the transistor, the current through the telephone transmitter may be about ten times as great, but is nevertheless only about three milliamperes.

As is generally understood, telephone voice currents are produced by the impinging of voice sound waves on the diaphragm of a telephone transmitter which transmitter, in a common battery circuit, is ordinarily connected in a low-resistance direct-current path across the loop at the station. In response to the sound waves, the resistance or the impedance of the transmitting element in the transmitter is varied and the amplitude of the direct current flowing through the transmitter is changed in amount proportional to the intensity of the sound waves and at a rate corresponding to the frequency of the sound waves to translate the sound waves into alternating-current speech signals. When the steady state magnitude of direct current flowing through the transmitter is only a few tenths of a milliampere or even a few milliamperes, the power of the generated voice frequency signals is relatively small compared to those generated when the current through the transmitter is normal. For instance, when the current through the transmitter is 30 milliamperes the power in the speech currents may be —14 decibels referred to an arbitrary reference; for three milliamperes, —25 decibels; and for 0.3 milliampere, —47 decibels. Speech signals of such low power as —25 decibels or —47 decibels may be masked by small inductive disturbances or noise which would be of no consequence in the case of speech signals of normal power.

In the present circuit the telephone transmitter is connected in the telephone set circuit in a low-resistance direct-current path across the loop at the station and in such manner that the direct current flowing through it is not limited by the relatively low-current carrying capacity of the transistor. More specifically, the telephone transmitter while connected in the input circuit of a transistor amplifier is nevertheless connected across the loop in a branch having only an inductance and resistance of low magnitude. Substantial telephone transmitter current is therefore available for modulation.

A feature of the invention therefore is the connection of a transistor amplifier in a subscriber telephone set in such manner that direct current of substantial magnitude, 15 milliamperes, for instance, instead of a few milliamperes or a few tenths of a milliampere, is available for modulation on relatively long loops.

In the usual form of telephone set the line current passes through the transmitter, the resistance of which becomes a limiting factor in determining the maximum allowable loop length. In the present telephone circuit the transmitter is located in a branch circuit with two other resistive elements in parallel with it. Hence, should the resistance of the transmitter reach extremely high values, the characteristic resistance of the set will be increased only a fraction of the increase that would take place were the parallel elements not connected thereto. In this event, particularly on long loops, the present set will continue to maintain signaling contact with the central office whereas the usual set will not.

Coadunate with the advantage of increased direct current available for modulation, is the advantage that the increased direct current normally flowing in the loop, when the transistor amplifier is disposed as in the present subscriber telephone circuit, is available for dial pulsing to control the establishing of connections and for the transmission of calling and for recalling and other supervisory signaling. When transistors are arranged in such manner that the loop current is limited to a few milliamperes, or a few tenths of a milliampere, the magnetic relays at the central switching station, which relays respond to dial pulses, line calling, recall and other signals, are required to be more sensitive, and are therefore substantially less reliable and more expensive, than when the loop currents are substantially larger.

A feature of the present invention, therefore, is a transistor amplifier disposed in a subscriber telephone set circuit in such manner that loop current of substantial magnitude is available for dial pulsing, line calling, recall and other supervisory signaling.

One of the important aspects of the invention is the introduction of a combination of elements connected to the emitter of the transistor, namely a two-branch parallel circuit having in one branch a variable resistor and in the other a variable capacitor, the relative magnitudes of the resistance and capacitance of which may be adjusted to afford a wide range of output level versus frequency characteristics to compensate for the high-frequency attenuation of any connected facility by virtue of the selective control of the negative series feedback thus established. It is pointed out particularly that the application of this feature is not limited to subscriber telephone sets but may be applied to other embodiments of an amplifier as required.

A feature of the invention, therefore, is a two-branch parallel circuit connected in series with the emitter of a transistor amplifier, said two-branch circuit comprising a resistor branch and a capacitor branch, said resistor and capacitor having relative magnitudes of resistance and capacitance selected to afford compensation for the high-frequency attenuation of a connected facility.

The invention may be understood from the following description when read with reference to the associated drawings which, taken together, disclose a preferred embodiment in which the invention is presently incorporated. It is to be understood, however, that the invention is not limited to incorporation in the present embodiment but may be practiced in other forms, which will be readily suggested to those skilled in the art from a consideration of the following.

Figure 1:
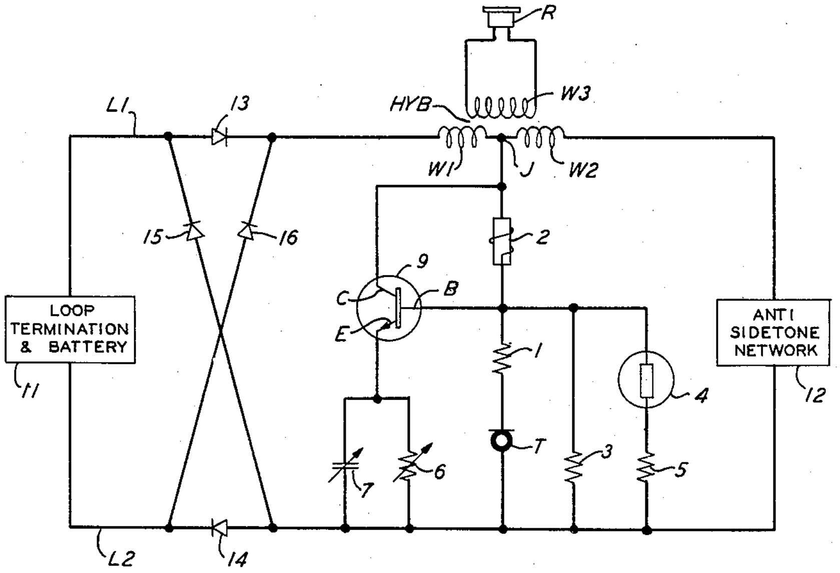
Fig. 1 shows the subscriber telephone set circuit of the present invention.

Refer now to Fig. 1, which shows the subscriber telephone set circuit of the present invention.

The circuit comprises a transmitter T, the upper terminal of which is connected in series with resistor 1 and lumped inductance 2 to the junction J of balanced windings W1 and W2 of a hybrid coil HYB. The receiver R is in series with the winding W3 of the hybrid coil, which winding is inductively coupled to windings W1 and W2. The winding W1 is connected through a dry rectifier 13, loop conductor L1, loop termination and battery 11, at the central station, loop conductor L2 and dry rectifier 14 to the bottom terminal of transmitter T. The right-hand terminal of winding W2 is connected through anti-sidetone network 12 to the bottom terminal of transmitter T. The left-hand terminal of dry rectifier 13 is connected through dry rectifier 15 to the right-hand terminal of dry rectifier 14. The right-hand terminal of dry rectifier 13 is connected through dry rectifier 16 to the left-hand terminal of dry rectifier 14. Dry rectifiers 13, 14, 15 and 16 are arranged to form a diode bridge having low series resistance and high shunt resistance. It is a polarity guard. Its function is to protect the transistor against reversals of polarity which sometimes occur in the telephone plant. With the polarity of the dry rectifier components 13, 14, 15 and 16 arranged as indicated in Fig. 1, whether the polarity of the battery applied to the upper loop conductor L1 is positive and that of the lower loop conductor L2 is negative, or vice versa, the polarity applied to the amplifier remains fixed.

The impedance of the loops L1 and L2 and of the termination 11 is substantially balanced by the impedance of anti-sidetone network 12 so that the generated alternating current flowing through the transmitting path, including the amplifier and the shunts around the transmitter, divide substantially equally between the path through the loop and that through the balancing network 12. The inductive effect in coil W3 of the voice and noise currents passing through coil W1 in transmitting from transmitter T, therefore, will be substantially balanced by the counter inductive effect of the voice and noise currents passing through coil W2 so that currents produced in receiver R due to transmission from transmitter T will be minimized.

The base electrode of transistor amplifier 9 is connected to the junction of the transmitter T and inductance 2. The collector of the transistor 9 is connected to the top terminal of inductance 2. The emitter of the transistor 9 is connected through resistor 6 and capacitor 7, arranged in parallel, and through dry rectifier 14 to conductor L2. The inductance 2, which preferably has also some resistance, connected between the base and collector connections of the transistor, has high impedance for currents of voice frequency so that the major portion of the amplified voice frequency output current is directed through junction J to the loop and to its anti-sidetone balancing network. Incoming voice signals pass through termination 11, loop conductor L1, coils W1 and W2, network 12 and loop conductor L2 in series and a portion through the shunt branches including the transistor amplifier. The inductive effects of coils W1 and W2 on coil W3 is additive so that the incoming signals are produced in receiver R.

Variable resistor 6 in series with the emitter is provided to improve alternating-current and direct-current stability of the transistor. The direct-current stability tends to deteriorate somewhat at high transistor temperatures which are reduced by the employment of variable resistor 6. The improved alternating-current stability is attributable to feedback. The variable capacitor 7 shunted across resistor 6 is selected with respect to its ohmic value to provide discrimination against low frequencies. In other words the feedback loss is greater for smaller relative values of capacitance with respect to a given value of resistance. Hence, with the excess gain afforded by supplying the transmitter with ample direct-current power, with the excess gain due to the amplifier itself, and with the response control, the frequency characteristic of the amplifier can be adjusted for any subscriber loop. Further, if required, the frequency response may be adjusted by varying the magnitude of the resistance of resistor 6 and of the capacitance of capacitor 7 to meet the needs of the system in which the transistor amplifier subscriber set is employed so as to improve intelligibility particularly on long loops. No such adjustment is provided in presently known subscriber sets with or without transistors as presently arranged. As stated in the foregoing, this is one of the important aspects of the invention and the principle may be applied widely to amplifiers connected to many types of circuits subject to variation in the attenuation of different frequencies.

Shunting transmitter T and resistor 1 is resistor 3. Also shunting transmitter T and resistor 1 is a series circuit including resistor 5 and a heat responsive variable resistor 4, sometimes termed a thermistor, which has a negative coefficient of resistance. Its function is to equalize transmission for loops of differing lengths. On short loops, when the direct current through the loop and through the transmitter T tends to be high, the resistance of variable resistor 4 decreases so that less current flows through the transmitter T. On long loops the magnitude of the resistance of thermistor 4 is high and its shunting effect is smaller so that more current flows through transmitter T. In like manner the combination of thermistor 4 and resistor 5 comprises an alternating-current shunt for the transmitter output, causing a greater loss or transmission equalization on short loops than on long loops. Resistor 3 affords a limiting maximum magnitude of resistance for the variable shunt.

The transistor 9 is preferably of the form known as a junction transistor. Junction transistors are well known in the art and are described in Patent 2,569,347 granted to W. Shockley and issued September 25, 1951, and in Patent 2,502,488 granted to W. Shockley and issued April 4, 1950. As described in these patents a junction transistor is a semiconductor amplifier of germanium or silicon having a zone of a particular conductivity type separating two zones of opposite conductivity type. The one zone may be of positive or negative conductivity known as P or N type, respectively. A so-called base connection is made to the one zone and connections called emitter and connector are made to the two like zones. In one form of operation, known as common emitter operation, when proper potentials are impressed on its electrodes, input signals may be applied between the emitter and the base and amplified output signals appear between the emitter and the collector.

It will be observed that, in the arrangement shown in Fig. 1, the transmitter T is connected in series wth resistor 1 and lumped inductance 2 directly across the loop. Resistor 1, and inductance 2 each has relatively small resistance so that substantial direct current flows through the transmitter and is available for modulation. As heretofore disposed when transistor amplifiers have been connected in subscriber set circuits, the transmitter has been connected either in series with the emitter or the base of the transistor. In either of these cases the current through the transmitter is limited by the current which may be passed through the transistor for the two conditions. Considering a loop of average length, for the common base connection, it is, as mentioned in the foregoing, about three-tenths of a milliampere and for the common emitter connection it is about three milliamperes, whereas for the present arrangement the current through the transmitter may be, for instance, fifteen milliamperes and the total loop current may be, for instance, fifty milliamperes.

The increased current is of importance not only in improving the transmission of speech signals but is of almost equal importance in the transmission of supervisory signals. When the current available for this purpose is in the range from say three-tenths of a milliampere to three milliamperes and the apparatus which responds to the supervisory signals is of the magnetic relay type, the relays must be more sensitive and consequently are more expensive. Sensitive relays designed to respond to currents of such small magnitudes generally are not so sturdy and reliable in their operation as the relays which respond to currents of normal value. Further, the more sensitive relays generally require more frequent adjustment and are more expensive to maintain.

Figs. 3, 4, 5, 6, 7, 8, 9 and 10 are actual graphs of measured data obtained in tests of the present set connected to a typical long loop. These graphs taken together disclose that the present subscriber telephone set circuit, having a transistor amplifier disposed as shown, not only performs the amplifying function but does in fact perform the function normally performed by loading on long loops. By this is meant that the set affords an output level versus frequency characteristic which compensates for the output level versus frequency characteristic of a long loop and thus greatly reduces the need for loading, otherwise required on long loops to effect this compensation. In each of these figures the ordinate is decibels and the abscissa is frequency in cycles per second.

Figure 3:
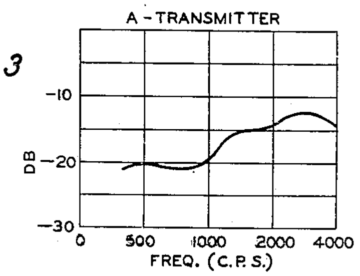

Refer now to Fig. 3 which shows a graph, labeled "A-transmitter," of the characteristic curve of a well-known good transmitter alone for a free field acoustic input. The transmitter is of the type described in Patent 2,607,859, granted to me, issued August 19, 1952. The graph indicates that the level of the frequencies in the range from about 400 cycles to 1000 cycles is fairly uniform in the range from −21 to −20 decibels. In the range from 1000 to 1500 cycles, the level rises rather sharply to about −15 decibels. From 1500 to 3000 cycles the level rises more slowly to about −12 decibels and from 3000 to 4000 cycles remains fairly constant in the range from −12 to −13 decibels. The transmitter is especially designed to afford a characteristic in which its output level rises for the higher frequencies, as such a characteristic has been found to promote naturalness in reproduction of the voice.

Figure 4:
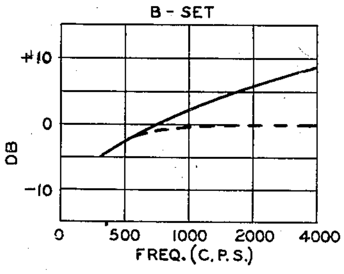

For purpose of comparison the output of this transmitter is applied to two different types of subscriber telephone sets having different characteristics, as indicated by the two lines in the graph, labeled "B-set," in Fig. 4. The solid line shows the characteristic of the present set. The dotted line shows the characteristic of another subscriber telephone set, of the type described in Patent 2,629,783 granted to H. F. Hopkins, issued February 24, 1953, which is well and favorably known in the industry and which incorporates some of the most important recent developments in the subscriber telephone set field, but does not include a transistor arranged in any manner. The set of Patent 2,629,783 will be hereinafter referred to as the known set. The output level of the present set, less the transmitter response characteristic, as shown by the solid line in Fig. 4, rises from about −5 to +8.5 decibels in the range from about 400 to 4000 cycles. The corresponding characteristic of the known set, indicated by the dotted lines, rises from about −5 to 0 decibels in the range from 400 to 1000 cycles and then remains substantially flat at 0 decibel from 1000 to 4000 cycles. In all of the diagrams used in explaining the invention, the solid lines pertain to the present set and the dotted lines to the known set.

Figure 5:
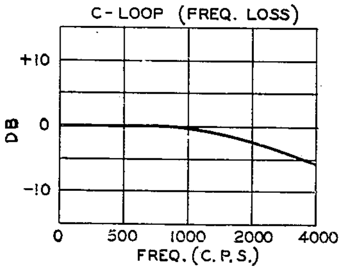

The output of each of the sets is applied to a long subscriber loop having a characteristic indicated by the graph, labeled "C-loop" in Fig. 5. As is apparent in this figure, and is generally well understood, the level of the signals in pasisng over a long loop drops as the frequency increases.

Figure 6:
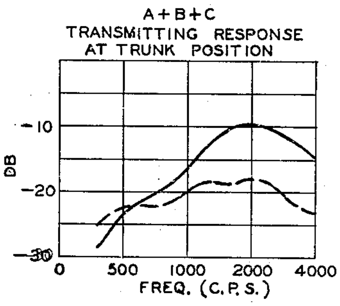

However, the signals from the two sets received at the central office, measured at the trunk position, after passing over the long loop from the subscriber station, are as shown in the graph of Fig. 6 labeled "A+B+C transmitting response at trunk position." It will be observed that for the present set the level of the higher frequency signals is considerably higher than that of the low-frequency signals and that, as compared to the known set, the level of the signals received from the present set in the range from 1500 to 4000 cycles is about 7 to 10 decibels higher.

Figure 7:
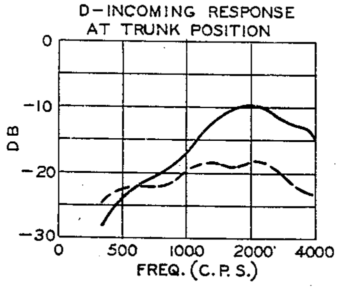
Figure 8:
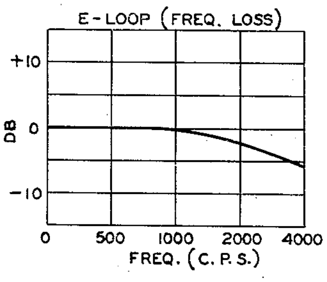
Figure 9:
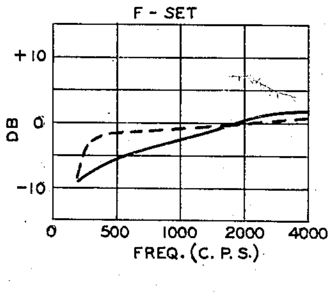

The signals incoming from both sets, applied at the trunk position to another long loop to a called subscriber, are, as indicated in the graph, labeled "D-incoming," in Fig. 7. These, it will be observed, are the same as those of the graph in Fig. 6. The characteristics of the second long loop are as indicated in the graph labeled "E-loop," shown in Fig. 8 which is the same as that shown in Fig. 5. The loop is terminated at different times on the second subscriber's premises in two subscriber telephone sets one of which is the present set which has a receiving response less the receiver response characteristic shown by the solid line and the other of which is the known set which has a receiving response as shown by the dotted line in the graph, labeled "F-set," in Fig. 9.

Figure 10:
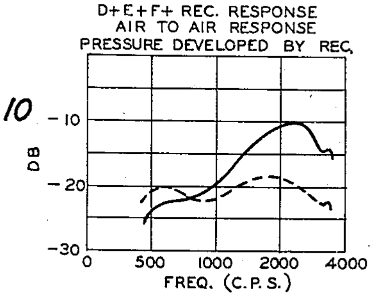

Finally the graph, labeled "D+E+F+ receiver response—Air to air response—Pressure developed by receiver," in Fig. 10, shows the ultimate air response of the receiver of the present set and that of the known set. It will be observed that the level of the signals throughout most of the frequency range and particularly the level of the higher frequencies is higher in the present set than in the known set.

Figure 11:
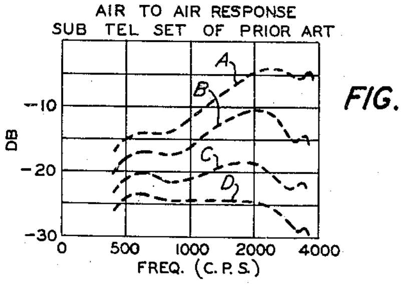

Refer now to Fig. 11 which shows a graph, labeled "Air to air response, sub tel set of prior art." The figure comprises four curves A, B, C and D. These curves all show the air to air response of the same known set above referred to. These are to be compared with the curves in Fig. 10. The dotted curve in Fig. 10 is for a loop of substantially greater than average length but not of the maximum operational length. The four curves shown in Fig. 11 are for four differing loop lengths and currents. The top curve A is for a very short loop. Curve B is for a short loop. Curve C is for a long loop. Curve D is for a very long loop. Ordinarily in the region of current operation on which curve D applies, the use of loading would be considered to overcome loop effects. These curves were made for connections of the known set through four 26 gauge loops, approximately 440 ohms to the mile, to central office terminating circuits of approximately 430 ohms resistance. The lengths of the loops were about zero, 1000 feet, 2 miles and 3 miles, respectively. The corresponding loop currents are approximately 87, 75, 30 and 25 milliamperes, respectively. The curves show the marked decrease in level for the higher frequency speech components as the loop length increases in the known set. Curve C of Fig. 11, which is for 30 milliamperes, is identical with the dotted curve of Fig. 10. The solid curve of Fig. 10 shows a higher level for the frequencies in the range above 1000 cycles than that of any curve of Fig. 11 except that of curve A for a very short loop. The solid curve of Fig. 10, which shows the characteristic for the set of the present invention adjusted for operation on a long loop, closely approximates the characteristic of curve B in Fig. 11 which, as stated, is the characteristic of the known set when operating on a short loop. It is apparent from the curve that there is a gain in output which for the adjustment shown amounts to about 5 decibels.

Figure 2:
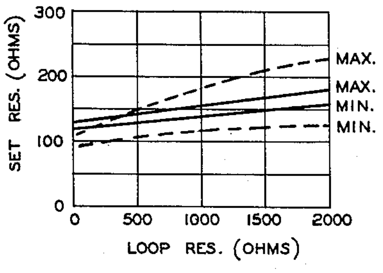
Figs. 2 to 11 are diagrams used in explaining the invention.

Refer now to Fig. 2 which shows another important advantage afforded by the subscriber telephone set circuit of the present invention, namely the greater stability of its resistance, as compared with that of the known set. In Fig. 2, subscriber telephone set resistance is plotted as ordinates against loop resistance as abscissae as measured under conditions to effectively compare this characteristic of the two sets.

As is well known the magnitude of the resistance of the carbon-type transmitter changes as it ages. Further, the subscriber telephone set of the present invention and the known set are each equipped with devices, such as have been described, which make them variable in the magnitude of their resistance, when connected in loops of differing lengths. To maintain supervision at all times and to facilitate design of the supervisory and control circuits, it is desirable that when transmitters of different ages and resistances are inserted in the set, the variation in resistance magnitude of the subscriber telephone set per se be as small as practicable for loops of differing lengths and resistances notwithstanding the variation in the magnitude of the resistance of the transmitters due to aging. Four sets of measurements were made on loops of differing length and resistance. In the first set of measurements a new transmitter, having low resistance, was inserted in the set. Then the set was connected in loops of differing length. The resistance of the subscriber set was found to vary as indicated in the lower solid line, designated MIN in Fig. 2. Next an old transmitter, having a relatively large magnitude of resistance, was selected and inserted in the set and the tests were repeated on the same group of loops. The measured resistance of the set now varied as shown in the upper solid line in Fig. 2 designated MAX. Next the same two transmitters, one new and of low resistance and one old and of high resistance, were inserted successively, in the known set, and the dotted curves designated MAX and MIN, respectively, in Fig. 2, were obtained.

It will be observed in Fig. 2 that the variation in resistance of the subscriber telephone set of the present invention for the differing loop lengths, as indicated by the vertical distance between the two solid lines at the various points along the curve, is smaller than that of the known set as indicated by the vertical distance between the dotted lines in Fig. 2.

What is claimed is:

1. In a communication system, a subscriber telephone set circuit connected to a subscriber loop, said set circuit having a transistor amplifier, said transistor amplifier having an emitter connection and a collector connection connected in series in a first branch across said loop, said transistor having a base connection, a telephone transmitter and a lumped inductance connected in series in a second branch across said loop, said base connected between said transmitter and said inductance.

2. In a communication system, a subscriber telephone set circuit connected to a subscriber loop circuit, said circuit having a junction-type transistor amplifier, said amplifier having an emitter electrode, a collector electrode and a base electrode, said emitter and collector electrodes connected in series in an amplifying path across said loop, a connection from said emitter to a first junction of a two-branch parallel circuit in said amplifying path, a resistor in one of said branches and a capacitor in the other of said branches, a second path across said loop, said second path comprising a telephone transmitter connected between a second junction of said two-branch circuit and said base electrode, and a lumped inductance in said second path connected between said base electrode and said collector electrode.

3. In a communication system, a subscriber telephone set, a long subscriber loop circuit connected to said set, said circuit having the characteristic greater attenuation of higher than lower frequencies, said subscriber set having a transistor amplifier therein, said transistor having an emitter and a collector thereon and frequency output adjusting means connected to said transistor to minimize the loading required to compensate for said attenuation characteristic, said adjusting means comprising a circuit branch connected from one side of said loop through a capacitor and a resistor in parallel and extending in series through said emitter and collector to the junction of a first and a second inductance coil in an anti-sidetone circuit in said set.

4. In a communication system, a communication line, a transistor amplifier connected to said line, said amplifier having a feedback circuit connected between a base electrode and an emitter electrode both on said transistor, a lumped capacitance connected in said circuit, a resistor shunting said capacitance, said capacitance and resistor proportioned to control the alternating-current power over the voice frequency range fed back to said transistor, so as to compensate for the frequency attenuation characteristic of said line.

5. In a communication system, a relatively long communication line, said line having the characteristic of greater attenuation for the higher frequencies than for the lower frequencies transmitted thereover, a transistor amplifier connected to said line, and means connected directly to said transistor to compensate for said frequency characteristic, said means comprising a feedback circuit connected to said transistor, said feedback circuit including a reactance and a resistance interconnected to discriminate between the frequencies fed back to said transistor.

6. In a communication system, a communication line of sufficiently long span that loading would ordinarily be connected to said line to correct its frequency versus loss characteristic, a transistor amplifier connected to said line, an input and an output circuit connected to said transistor, a feedback path between said input and output circuits and adjustable impedance elements in said feedback path, said elements comprising an adjustable lumped reactance and an adjustable lumped resistance, to selectively adjust the frequency characteristic of said amplifier to tend to correct said characteristic.

7. In a communication system, a subscriber telephone set connected to a subscriber loop, said set having a low-resistance direct-current branch connected directly across the loop, said branch including a telephone transmitter and a transistor amplifier in said set, said amplifier having an input circuit connected to said transmitter.

No references cited.